United States Patent [19]

Shibata et al.

[11] Patent Number: 5,479,323
[45] Date of Patent: Dec. 26, 1995

[54] VEHICULAR CORNERING LAMP SYSTEM

[75] Inventors: Hiroki Shibata; Takayuki Unno; Tomoaki Serizawa, all of Shizuoka, Japan

[73] Assignee: Koito Manufacturing Co., Ltd., Tokyo, Japan

[21] Appl. No.: 151,799

[22] Filed: Nov. 15, 1993

[30] Foreign Application Priority Data

Nov. 19, 1992 [JP] Japan ................................. 4-332251
Mar. 16, 1993 [JP] Japan ................................. 5-080274

[51] Int. Cl.⁶ .................................................. B60Q 1/08
[52] U.S. Cl. ...................... 362/71; 362/420; 364/424.05
[58] Field of Search ............................. 362/66, 71, 72, 362/276, 420; 315/82; 364/424.05

[56] References Cited

U.S. PATENT DOCUMENTS

| | | | |
|---|---|---|---|
| 4,204,270 | 5/1980 | Poirier d'Ange d'Orsay | 362/71 |
| 4,223,375 | 9/1980 | Alphen | 362/72 |
| 4,663,696 | 5/1987 | Miyazawa et al. | 362/80 |
| 4,733,333 | 3/1988 | Shibata et al. | 362/40 |
| 4,827,388 | 5/1989 | Miyazawa | 362/284 |
| 4,831,506 | 5/1989 | Miyazawa | 362/284 |
| 4,858,080 | 8/1989 | Oikawa | 362/66 |
| 4,891,559 | 1/1990 | Matsumoto et al. | 315/82 |
| 4,908,560 | 3/1990 | Shibata et al. | 318/603 |
| 4,943,893 | 7/1990 | Shibata et al. | |
| 4,963,794 | 10/1990 | Shibata et al. | |
| 4,970,906 | 11/1990 | Shibata et al. | 73/865.80 |

FOREIGN PATENT DOCUMENTS 2450777  3/1983  Germany.

*Primary Examiner*—Ira S. Lazarus
*Assistant Examiner*—Sara Sachie Raab
*Attorney, Agent, or Firm*—Sughrue, Mion, Zinn, Macpeak & Seas

[57] ABSTRACT

A vehicular cornering lamp system which can be adapted to all types and models of vehicles without having to change the correspondence of the illuminating angle with specific characteristics of the vehicle. The angular velocity of the vehicle is detected when the vehicle is traveling on a curve by an angular velocity sensor. Pulses from a distance sensor are counted to detect the vehicle's velocity. Angular velocity data and vehicle velocity data are latched by respective latch circuits. The reciprocal of the turning radius is calculated directly by dividing the angular velocity data by the vehicle velocity data in a divider. There is carried out an arithmetic operation of calculating the reciprocal of the turning radius after calculating the turning radius by dividing the vehicle velocity data by the angular velocity data. The illuminating angle can be approximated as a simple inverse function with respect to the turning radius. The target position of the illuminating angle is calculated as an inverse function with respect to the turning radius so that the illuminating angle of headlamp is controlled so as to be coincident with the target position.

16 Claims, 6 Drawing Sheets

| INPUT VOLTAGE(V) | SIGN | OUTPUT CODE |
|---|---|---|
| 5.000 | 0 (+) | 7F |
| 4.981 | 0 (+) | 7E |
| ⋮ | ⋮ | ⋮ |
| 2.519 | 0 (+) | 01 |
| 2.500 | 0 (+) | 00 |
| 2.481 | 1 (−) | 01 |
| ⋮ | ⋮ | ⋮ |
| 0.019 | 1 (−) | 7E |
| 0.000 | 1 (−) | 7F |

| INPUT CODE | SIGN | OUTPUT VOLTAGE(V) |
|---|---|---|
| 7F | 0 (+) | 5.000 |
| 7E | 0 (+) | 4.981 |
| ⋮ | ⋮ | ⋮ |
| 01 | 0 (+) | 2.519 |
| 00 | 0 (+) | 2.500 |
| 01 | 1 (−) | 2.481 |
| ⋮ | ⋮ | ⋮ |
| 7F | 1 (−) | 0.019 |
| 7E | 1 (−) | 0.000 |

…

VEHICULAR CORNERING LAMP SYSTEM

BACKGROUND OF THE INVENTION

The present invention relates to a vehicular cornering lamp system for variably changing the illuminating direction of a lighting device in accordance with a direction of steering of the vehicle.

Automotive vehicles have a pair of headlamps provided on left and right sides of the front of the vehicle in order to provide illumination in the forward direction. The headlamps are fixedly mounted so as to provide illumination only in the forward direction of the vehicle. As a result, when the vehicle is traveling on a curvy road, it is impossible to always provide sufficient illumination in the direction of movement of the car, sometimes creating a dangerous situation.

To alleviate the above-mentioned problem, there has been recently proposed a cornering lamp system (steering interlock lamp system), wherein the illuminating direction (illuminating angle) of the headlamps is varied in accordance with the rotational angle of the steering wheel of the vehicle, or in accordance with the steering angle of the front wheels, thereby to cause the headlamps to provide illumination continuously in the direction of movement of the vehicle.

In the above-mentioned conventional cornering lamp system, however, because the gear ratio of steering mechanisms varies among vehicle types and models, the correspondence between the rotational angle of the steering wheel and the illuminating angle of the headlamps must be established in accordance with the particular model with which the system is to be used. Further, due to variations in wheel base among different models, the correspondence between the steering angle of the front wheel and the illuminating angle must be established in accordance with the model.

SUMMARY OF THE INVENTION

Accordingly, an object of the present invention is to overcome the above-mentioned problems, and to provide a vehicular cornering lamp system having a system configuration which can be adapted to all vehicles without any change of correspondence with respect to the illuminating angle.

To attain the foregoing object, the invention provides the vehicular cornering lamp system comprising an angular velocity detection means for detecting the angular velocity of the vehicle when traveling on a curve, a vehicle velocity detection means for detecting the velocity of the vehicle, a target position calculation means for calculating a target position of the illuminating angle of the lighting means on the basis of the vehicle velocity detected by the vehicle velocity detection means and the angular velocity detected by the angular velocity detection means, and an illuminating angle control means for controlling the current position of the illuminating angle of the lighting means to cause it to be coincident with the target position calculated by the target position calculation means.

Further, in accordance with a second aspect of the invention, there is provided a vehicular cornering lamp system including an angular velocity detection means for detecting the angular velocity of the vehicle when traveling on a curve, a vehicle velocity detection means for detecting the velocity of the vehicle on the basis of pulses which are generated by a distance sensor at travel intervals of a predetermined distance, a turning radius calculation means for calculating a turning radius by dividing the vehicle velocity detected by the vehicle velocity detection means by the angular velocity detected by the angular velocity detection means, a target position calculation means for calculating a target position of the illuminating angle of the lighting means on the basis of the turning radius calculated by the turning radius calculation means, and an illuminating angle control means for controlling the current position of the illuminating angle of the lighting means to cause it to be coincident with the target position calculated by the target position calculation means.

Still further, in accordance with a third aspect, the invention provides a vehicular cornering lamp system comprising an acceleration detection means for detecting lateral acceleration when the vehicle is traveling on a curve, a vehicle velocity detection means for detecting a vehicle velocity, a target position calculation means for calculating a target position of the illuminating angle of the lighting means on the basis of the vehicle velocity detected by the vehicle velocity detection means and the lateral acceleration detected by the acceleration detection means, and an illuminating angle control means for controlling the current position of the illuminating angle of the lighting means to cause to be coincident width the target position calculated by the target position calculation means.

Yet further, accordance with a fourth aspect of the invention there is provided a vehicular cornering lamp system including an angular velocity detection means for detecting lateral acceleration when the vehicle is traveling on a curve, a vehicle velocity detection means for detecting the velocity of the vehicle on the basis of pulses generated by a distance sensor at travel intervals of a predetermined distance, a turning radius calculation means for calculating a turning radius by dividing the square of the vehicle's velocity detected by the vehicle velocity detecting means by the lateral acceleration detected by the acceleration detection means, a target position calculation means for calculating a target position of the illuminating angle of the lighting means on the basis of the turning radius calculated by the turning radius calculation means, and an illuminating angle control means for controlling the current position of the illuminating angle of the lighting means to cause it to be coincident with the target positioning calculated by the target position calculation means.

According to the first aspect of the invention, the target position of the illuminating angle is calculated on the basis of the vehicle velocity and the angular velocity of the vehicle, so that the current position of the illuminating angle is controlled so as to be coincident with the target position.

According to the second aspect of the invention, the turning radius is calculated by dividing the vehicle velocity by the angular velocity of the vehicle, so that the target position of the illuminating angle is calculated on the basis of the turning radius, and the current position of the illuminating angle is controlled so as to be coincident with the target position.

According to the third aspect of invention, the target position of the illuminating angle is calculated on the basis of the vehicle velocity and the lateral acceleration, so that the current position of the illuminating angle is controlled so as to be coincident with the target position.

According to the fourth aspect of the invention, the turning radius is calculated by dividing the square of the vehicle velocity by the lateral acceleration, so that the target position of the illuminating angle is calculated on the basis of the turning radius, and the current position of the illuminating angle is controlled so as to be coincident with the

3 target position.

BRIEF DESCRIPTION OF THE DRAWINGS

FIGS. 2(a) and 2(b) are diagrams for explaining the relations among radius r, velocity v and angular velocity $\Omega$ and the relations among radius r, velocity v and lateral acceleration a;

DESCRIPTION OF THE PREFERRED EMBODIMENTS

The present invention will be described below in detail on the basis of preferred embodiments thereof.

First, the basic theory of the present invention will be explained.

Figure 2A:
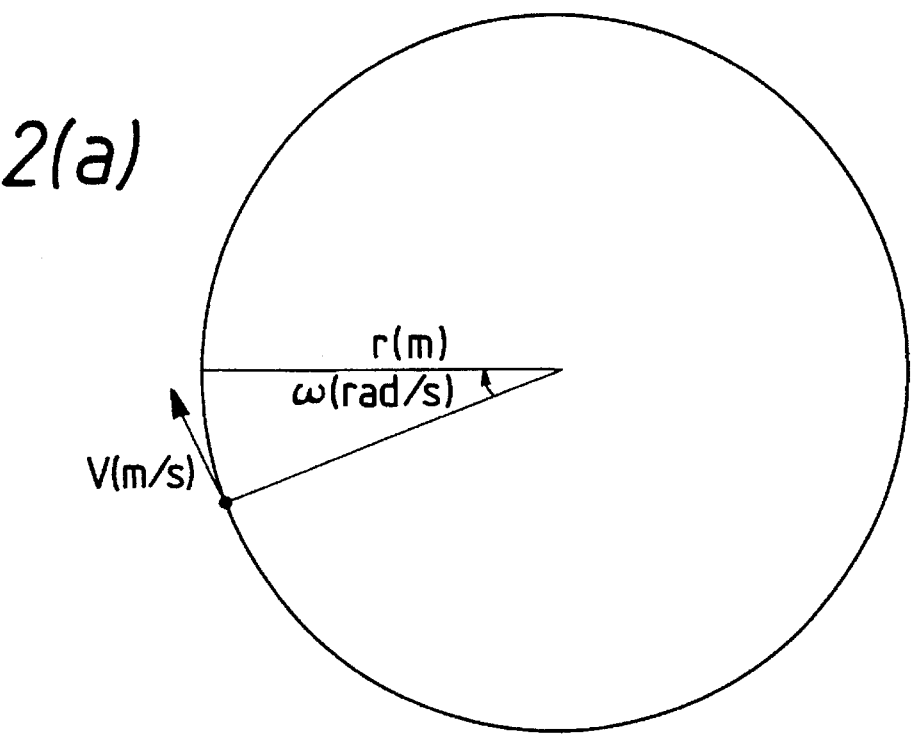
Figure 2B:
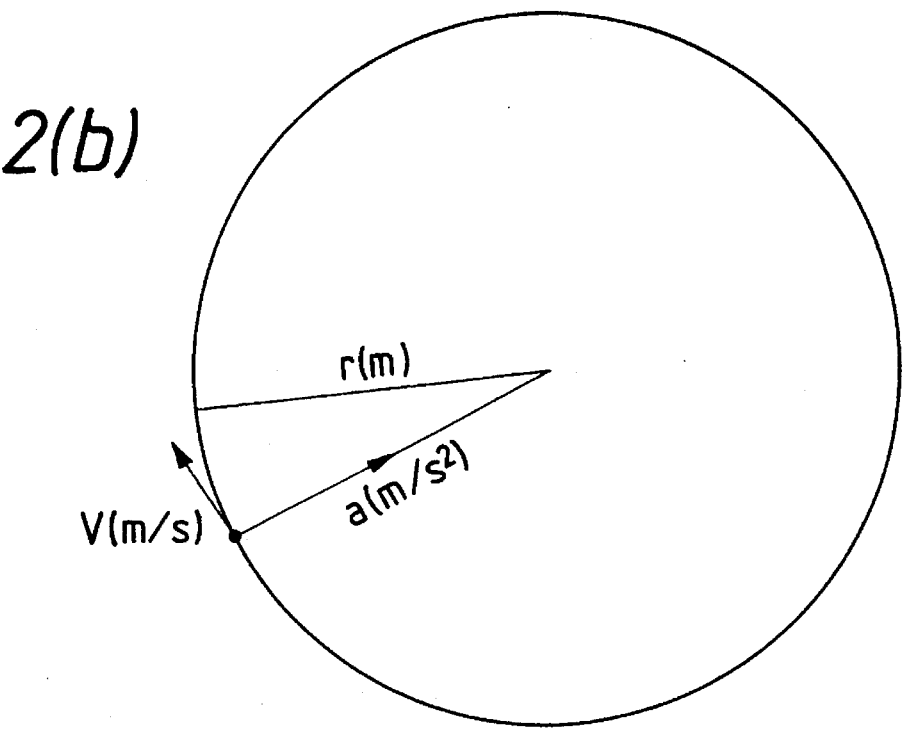

When the angular velocity of an object moving at a velocity v (m/s) on a circle with a radius r (m) is represented by $\Omega$ (radians/s) (see FIG. 2 (a)), the following equation is satisfied:

$$r = v/\Omega \ (m)$$

With the lateral acceleration of an object moving at velocity v (m/s) on a circle with radius r (m) represented by a (m/s$^2$) (see FIG. 2 (b)), the following equation is satisfied:

$$r = v^2/a$$

The correspondence between the turning radius and the illuminating angle of the headlamps now will be derived.

Figure 3:
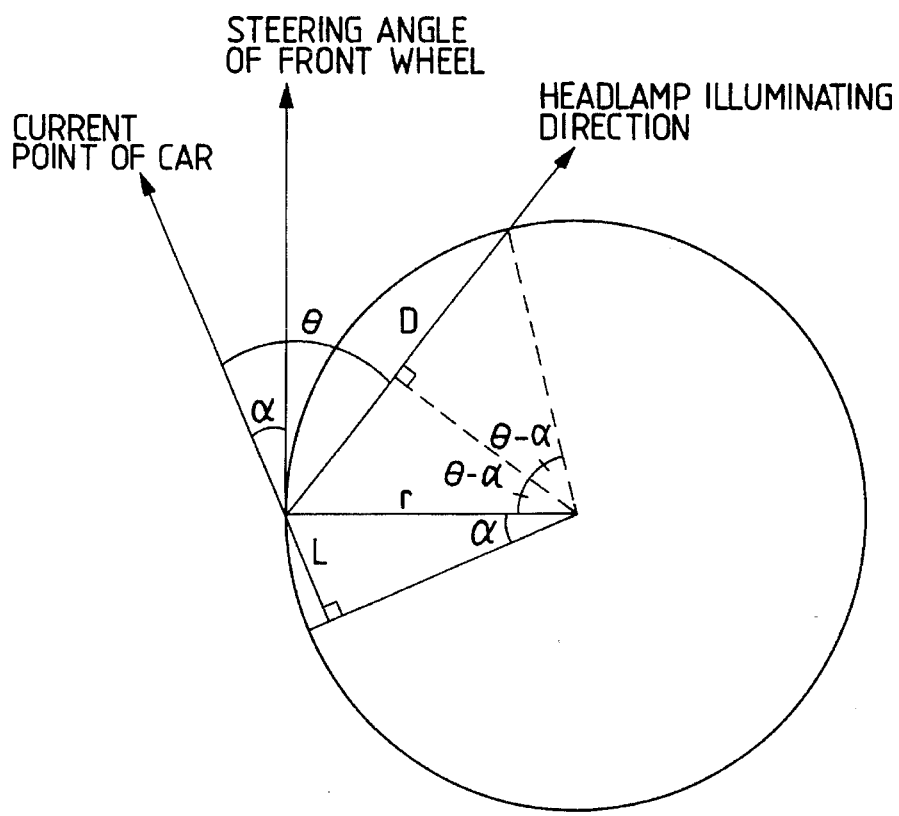
FIG. 3 is a diagram for explaining the correspondence between the turning radius r and the illuminating angle $\theta$ of headlamps.

When the turning radius, the illuminating angle, the wheel base of the car and the steering angle of the front wheel represented by r, $\theta$, L and $\alpha$ respectively (see FIG. 3), the illuminating distance D of the headlamps is expressed by:

$$D = 2r \cdot \sin(\theta - \alpha) \quad \text{(I)}$$

in which:

$$L = r \cdot \sin\alpha \quad \text{(II)}$$

Here, the illuminating distance D is defined to be the distance between the current position of the car and an intersecting point of the main optical axis of the headlamps and a locus (circle) on which the car will mass. Because it is desired from the driver's point of view for the illuminating angle $\theta$ to be controlled to keep the illuminating distance D constant regardless of the turning radius r, D is made constant.

In the case of r >> L, equation (I) can be approximated as follows:

$$D \approx 2r \cdot \sin\theta \quad \text{(III)}$$

Figure 4:
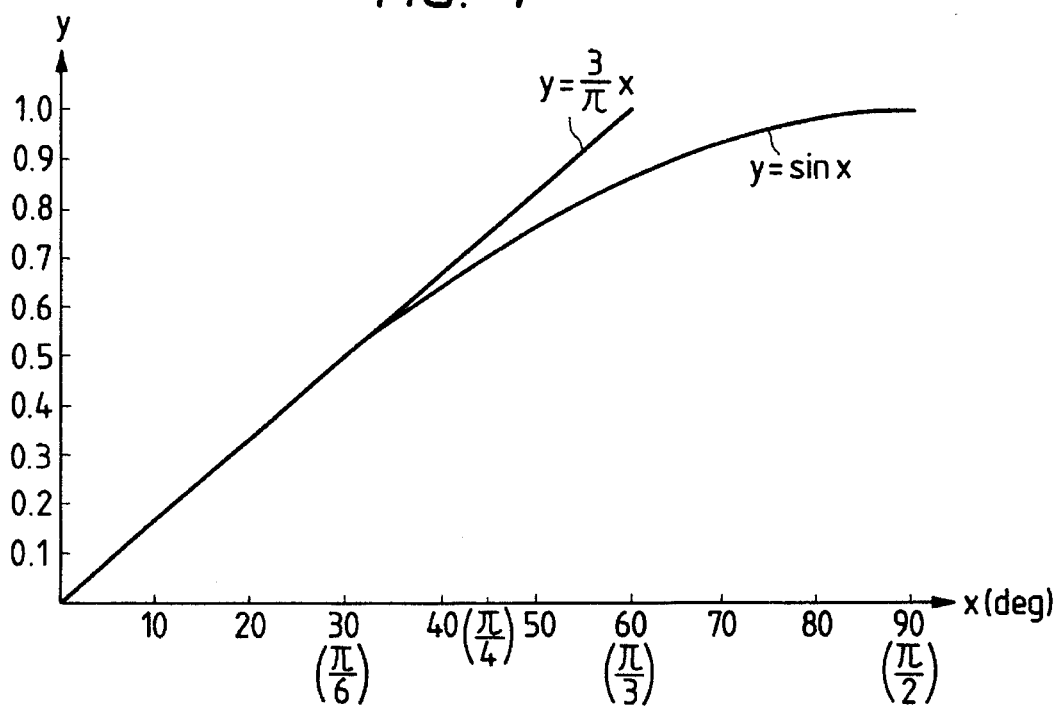
FIG. 4 is a graph of a linear approximation of a trigonometric function.

Further, in the case of $0 \leq \theta \leq \pi/6$, $\theta$ can be approximated as follows (see FIG. 4):

$$\sin\theta \approx 3\theta/\pi \quad \text{(IV)}$$

When a solution of $\theta$ is calculated by substituting equation (IV) for the equation (III), the following equation is obtained:

$$\theta \approx \pi D/6r \quad \text{(V)}$$

In equation (V), $\pi$ is a constant, and D is a constant as described above. Accordingly, when $\pi D/6$ is replaced by K (constant), equation (V) is expressed as follows:

$$\theta \approx K/r \quad \text{(VI)}$$

It is apparent from equation (VI) that the illuminating angle $\theta$ can be approximated as a simple inverse function with respect to the turning radius r.

The present invention, based on the above-mentioned theory, will be further described below on the basis of the following embodiments.

Figure 1:
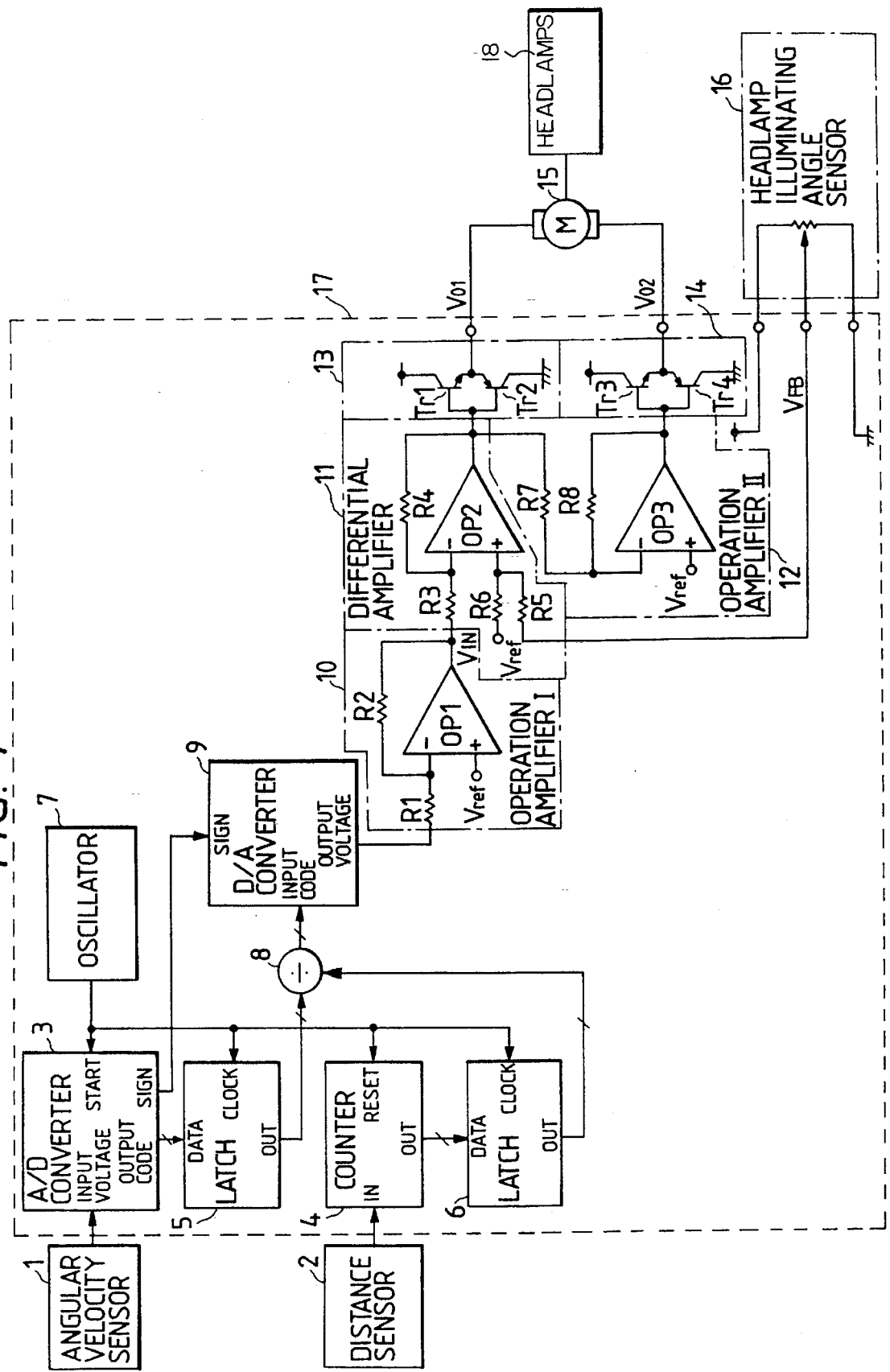
FIG. 1 is a block diagram showing a first embodiment of a vehicular cornering lamp system of the present invention.
Figures 5, 6:
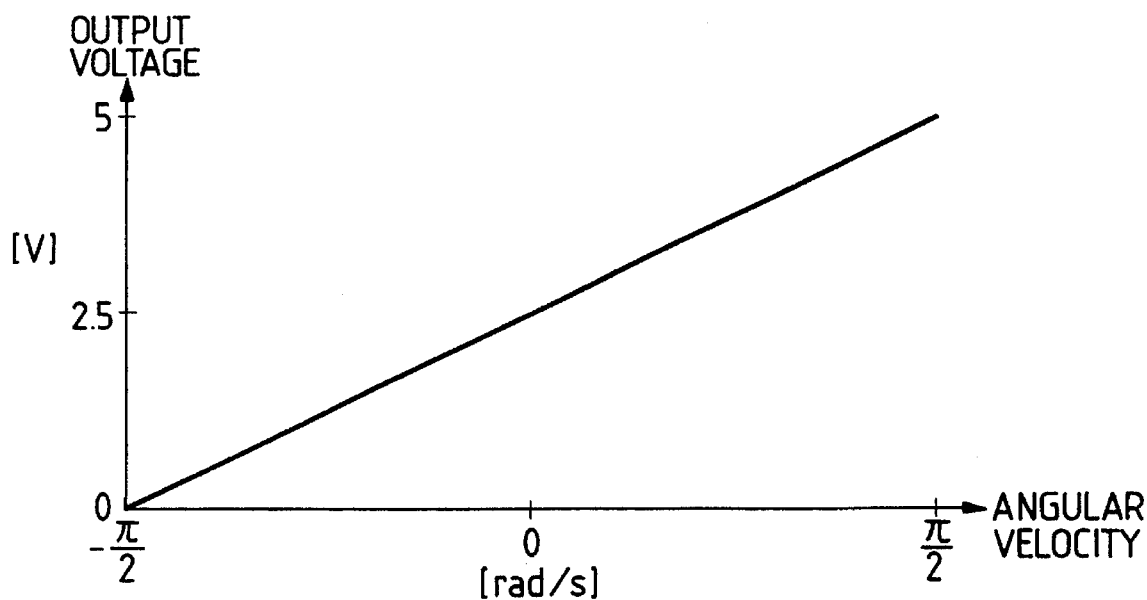
FIG. 5 is a graph of an angular velocity-output voltage characteristic of the angular velocity sensor used in the practice of the invention.
FIG. 6 is a view of an input-output characteristic of an A/D converter used with the invention.

FIG. 1 is a block diagram showing a first embodiment of the present invention. In the drawing, reference numeral 1 designates an angular velocity sensor disposed within a vehicle; 2, a well-known distance sensor for generating pulses at travel intervals of a predetermined distance; 3, an A/D converter; 4, a counter; 5, a first latch circuit; 6, a second latch circuit; 7, an oscillator; 8, a divider; 9, a D/A converter; 10, a first inverting amplifier; 11, a differential amplifier; 12, a second inverting amplifier; 13, a first booster circuit; 14, a second booster circuit; 15, a motor for varying the illuminating angle of headlamps 18; and 16, a headlamp illuminating angle sensor for outputting a voltage $V_{FB}$ corresponding to the illuminating angle of the headlamps in accordance with the rotation of the motor 15.

in this embodiment, the headlamp illuminating angle sensor 16 is constituted by a variable resistor which rotates coaxially with a final output shaft of a reduction gear unit (not shown) for reducing the rotational speed of the motor 15 to thereby output a voltage $V_{FB}$ in accordance with the current position of the illuminating angle of the headlamps. Further, the angular velocity sensor 1 has angular velocity-output voltage characteristics as shown in FIG. 5.

The first inverting amplifier 10 is constituted by an operational amplifier OP1 and resistors R1 and R2. The differential amplifier 11 is constituted by an operational amplifier OP2 and resistors R3 to R6. The second inverting amplifier is constituted by an operational amplifier OP3 and resistors R7 and R8. The first booster circuit 13 is constituted by transistors Tr1 and Tr2. The second booster circuit 14 is constituted by transistors Tr3 and Tr4.

The operation of the cornering lamp system now will be described in conjunction with functions of respective parts.

When the vehicle is traveling around a curve, the angular velocity sensor 1 outputs a voltage corresponding to the current angular velocity. The voltage is fed to the A/D converter 3. The A/D converter 3 performs A/D conversion as represented by the input-output characteristic (truth table) shown in FIG. 6 with use of the oscillation period of the oscillator 7 as a sampling period to thereby feed the conversion result output code as angular velocity data to the latch circuit 5 and the sign thereof to the D/A converter 9.

On the other hand, pulses generated by the distance sensor 2 at intervals of a predetermined distance are counted by the counter 4. The count value of the counter 4 is latched by the latch circuit 6 in the above-mentioned sampling period and converted into velocity data.

The angular velocity data latched by the latch circuit 5 and the vehicle velocity data latched by the latch circuit 6 are fed to the divider 8. The divider 8 calculates the reciprocal of the turning radius by dividing the angular velocity data by the vehicle velocity data. In this embodiment, the reciprocal of the turning radius is calculated directly by dividing the angular velocity data by the vehicle velocity data, because the illuminating angle is expressed by an inverse function with respect to the turning radius (see equation (VI)). That is, there is carried out an arithmetic operation of calculating the reciprocal of the turning radius after calculating the turning radius by dividing the vehicle velocity data by the angular velocity data.

The arithmetic operation result produced by the divider 8 is fed to the D/A converter 9. The D/A converter 9 performs D/A conversion as represented by the input-output characteristic (truth table) shown in FIG. 7, and feeds the conversion result output voltage to the inverting input terminal of the inverting amplifier 10. That is, an output voltage corresponding to the reciprocal of the turning radius is applied to an inverting input terminal of the inverting amplifier 10.

The inverting amplifier 10 amplifies the output voltage of the D/A converter 9 by a factor −K and outputs the amplification result. The output voltage $V_{IN}$ of the inverting amplifier 10 corresponds to the target position of the illuminating angle of the headlamps. Although the reciprocal of the turning radius is amplified by a factor −K in the inverting amplifier 10, the resulting value is applied to the inverting input terminal of the differential amplifier of the next stage to thereby be re-invert the signal to adjust its phase.

The output voltage $V_{IN}$ of the inverting amplifier 10 is fed to the inverting input terminal of the differential amplifier 11. The differential amplifier 11 amplifies the difference between the output voltage $V_{IN}$ of the inverting amplifier 10 and the output voltage $V_{FB}$ of the illuminating angle sensor 16, that is, the difference between the voltage $V_{IN}$ corresponding to the target position of the illumination angle of the headlamps and the voltage $V_{FB}$ corresponding to the current position thereof.

The output voltage of the differential amplifier 11 is power-amplified in the booster circuit 13 to thereby form an output voltage $V_{o1}$, which is fed to a terminal of the motor 15. On the other hand, the output voltage of the differential amplifier 11 is inverted (amplified by a factor of −1) with respect to a reference voltage $V_{ref}$ in the inverting amplifier 12, and then power-amplified by the booster circuit 14 to thereby form an output voltage $V_{o2}$, which is fed to the other terminal of the motor 15. In this manner, a voltage difference is produced between the opposite terminals of the motor 15 to rotate the motor 15, so that the current position of the illuminating angle of the headlamps is controlled so as to be coincident with the target position.

Although the above-described embodiment relates to the case where the angular velocity sensor 1 and the arithmetic unit 17 (surrounded by the broken line in the drawing) are provided separately, the invention can be applied to the case where they are united into one body. In the case where they are united into one body, wiring from the angular velocity sensor 1 to the arithmetic unit 17 can be omitted to attain simplification of the configuration.

Figure 8:
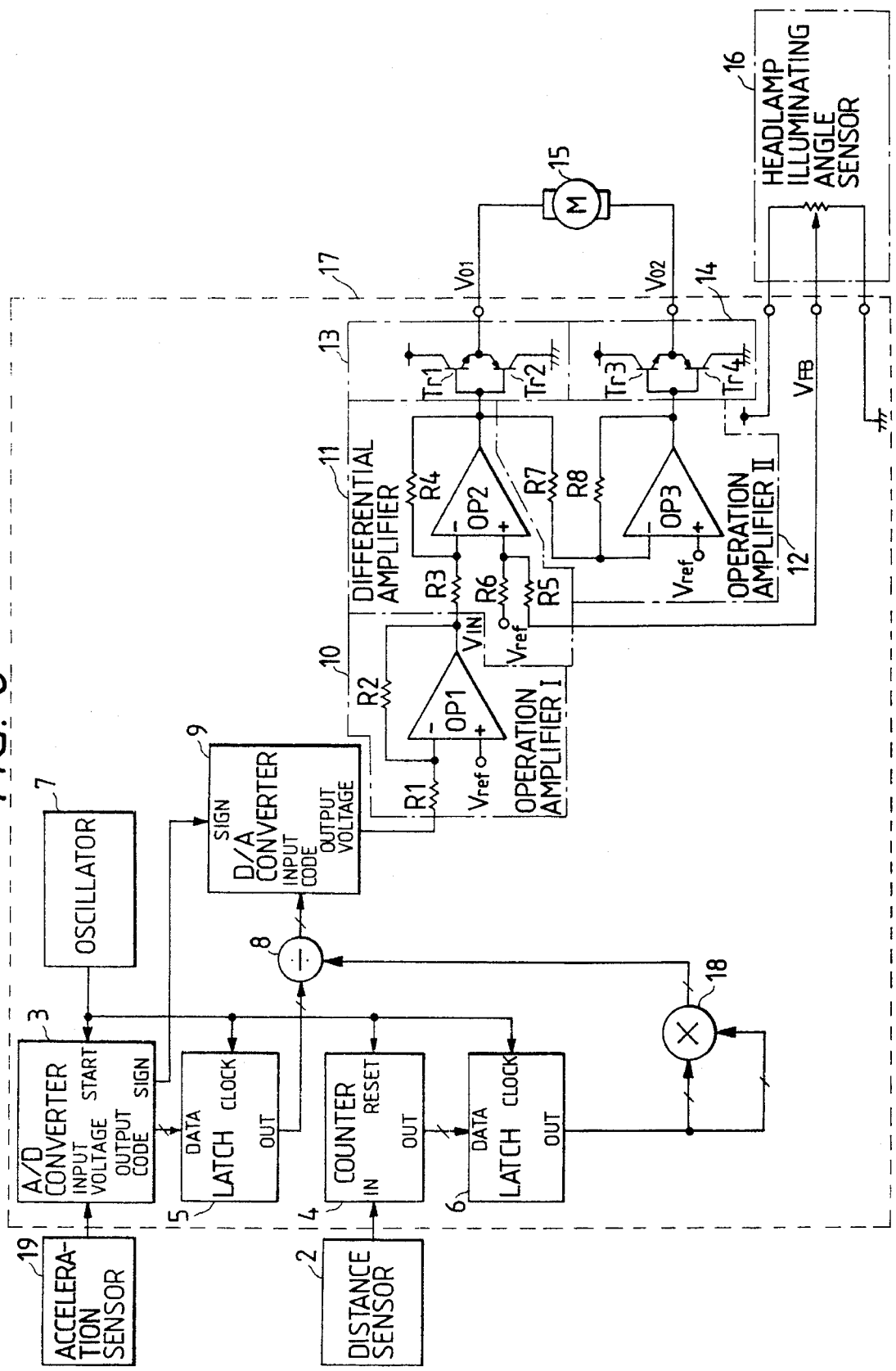
FIG. 8 is a block diagram showing a second embodiment of the present invention.

FIG. 8 is a block diagram showing a second embodiment of the present invention. In the drawing, reference numerals the same as those in FIG. 1 refer to the same or like constituent parts, and hence a further detailed description thereof will be omitted.

Figures 7, 9:
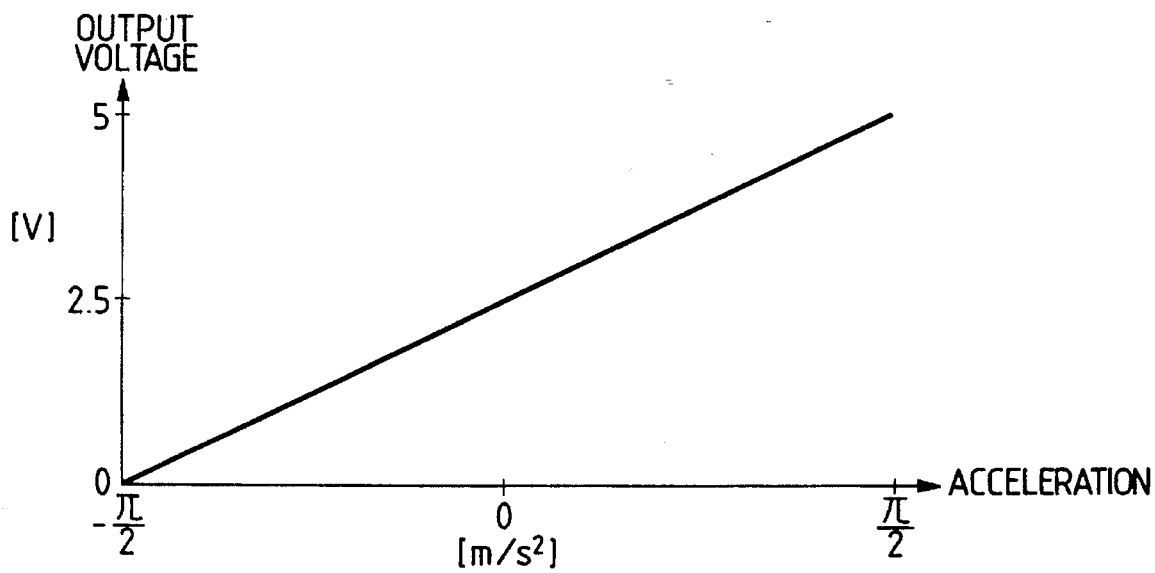
FIG. 7 is a view of an input-output characteristic of an D/A converter used with the invention.
FIG. 9 is a graph of an acceleration-output voltage characteristic of an acceleration sensor used in the invention.

The second embodiment relates to the case where the angular velocity sensor 1 is replaced by an acceleration sensor 19 so that the lateral acceleration of the vehicle is detected by the acceleration sensor 19. Further, a multiplier 18 is disposed between the latch circuit 6 and the divider 8. The acceleration sensor 19 has acceleration-output voltage characteristics as shown in FIG. 9.

The operation of the cornering lamp system will be described in conjunction with functions of respective parts.

When the vehicle is traveling around a curve, the acceleration sensor 1 outputs a voltage corresponding to the current lateral acceleration. The voltage is fed to the A/D converter 3. The A/D converter 3 performs A/D conversion as represented by input-output characteristic (truth table) shown in FIG. 6 with use of the oscillation period of the oscillator 7 as a sampling period to thereby feed the conversion result output code as acceleration data to the latch circuit 5 and the sign of the result to the D/A converter 9.

On the other hand, pulses generated by the distance sensor 2 at intervals of a predetermined distance are counted by the counter 4. The count value of the counter 4 is latched by the latch circuit 6 in the above-mentioned sampling period and converted into velocity data. The vehicle velocity data latched by the latch circuit 6 is squared by the multiplier 18.

The angular velocity data latched by the latch circuit 5 and the vehicle velocity data squared by the multiplier 18 are fed to the divider a. The divider 8 calculates the reciprocal of the turning radius by dividing the angular velocity data by the square of the vehicle velocity data. In this embodiment, the reciprocal of the turning radius is calculated directly by dividing the acceleration data by the square of the vehicle velocity data, because the illuminating angle is expressed by an inverse function with respect to the turning radius (see equation (VI) in the description of the basic theory). That is, there is carried out an arithmetic operation of calculating the reciprocal of the turning radius after calculating the turning radius by dividing the square of the vehicle velocity data by the acceleration data.

The subsequent operation is the same as in the first embodiment, and thus a further description thereof will be omitted.

As is evident from the above description, in accordance with the first aspect of the present invention, the target position of the illuminating angle is calculated on the basis of the vehicle velocity and the rotation angular velocity, and the current position of the illuminating angle is controlled so as to be coincident with the target position. Further, according to the second aspect of the invention, the turning radius is calculated by dividing the vehicle velocity by the angular velocity, so that the target position of the illuminating angle is calculated on the basis of the turning radius, and hence the current position of the illuminating angle is controlled so as to be coincident with the target position. Further, according to the third aspect of the invention, the target position of the illuminating angle is calculated on the basis of the vehicle's velocity and lateral acceleration, and the current position of the illuminating angle is controlled so as to be coincident with the target position. Further, according to the fourth aspect of the invention, the turning radius is calculated by dividing the square of the vehicle velocity by the lateral acceleration, so that the target position of the illuminating angle is calculated on the basis of the turning radius, and the current position of the illuminating angle is controlled so as to be coincident with the target position. Accordingly, one system configuration can be adapted to all vehicles without changing the correspondence with respect to the illuminating angle.

What is claimed is:

1. A vehicular cornering lamp system for varying the illuminating angle of a lighting means of a vehicle on which said lamp system is mounted and which is traveling on a curve, comprising:

angular velocity detection means for detecting an angular velocity of said vehicle when said vehicle is traveling on a curve;

a distance sensor for producing pulses at travel intervals of said vehicle of a predetermined distance;

vehicle velocity detection means for detecting a velocity of said vehicle on the basis of said pulses generated by said distance sensor;

turning radius calculation means for calculating a turning radius of said vehicle by dividing said vehicle velocity detected by said vehicle velocity detection means by said angular velocity detected by said angular velocity detection means;

target position calculation means for calculating a target position of said illuminating angle of said lighting means on the basis of said turning radius calculated by said turning radius calculation means; and illuminating angle control means for controlling said illuminating angle of said lighting means to be coincident with said target position calculated by said target position calculation means.

2. A vehicular cornering lamp system for varying the illuminating angle of a lighting means of a vehicle on which said lamp system is mounted and which is traveling on a curve, comprising:

acceleration detection means for detecting a lateral acceleration of said vehicle when said vehicle is traveling on a curve;

vehicle velocity detection means for detecting a velocity of said vehicle;

calculation means for calculating a turning radius by dividing the square of said vehicle velocity by said lateral acceleration and calculating a target position of said illuminating angle of said lighting means on the basis of said turning radius; and illuminating angle control means for controlling said illuminating angle of said lighting means to be coincident with said target position calculated by said calculation means.

3. The vehicular cornering lamp system of claim 2, wherein said illuminating angle control means comprises a motor for controlling said illuminating angle and a differential amplifier for calculating a difference between an actual position of said illuminating angle and the target position calculated by said calculation means and for controlling said motor in accordance with said difference.

4. The vehicular cornering lamp system of claim 3, wherein said illuminating angle control means further comprises an illuminating angle sensor for detecting the actual position of said illuminating angle of said lighting means.

5. The vehicular cornering lamp system of claim 4, wherein said illuminating angle control means controls said illuminating angle of said lighting means so that the actual position detected by said illuminating angle sensor becomes coincident with said target position calculated by said calculation means.

6. The vehicular cornering lamp system of claim 2, wherein said calculation means comprises an A/D converter for converting said lateral acceleration into a digital signal, a counter for outputting said vehicle velocity as counted velocity data, a multiplier for squaring the counted velocity data, a divider for dividing the digital signal by the output from said multiplier, a D/A converter for converting the output from said divider into an analog Signal, and an operation amplifier for outputting said target position by inverting and amplifying said analog signal.

7. The vehicular cornering lamp system of claim 6, further comprising a first latch coupled between said A/D converter and said divider, and a second latch coupled between said counter and said multiplier, for latching, respectively, the digital signal and the counted velocity data.

8. The vehicular cornering lamp system of claim 2, wherein an arithmetic unit housing at least said calculation means and said illuminating angle control means is unitarily formed with said acceleration detection means.

9. A vehicular cornering lamp system for varying the illuminating angle of a lighting means of a vehicle on which said lamp system is mounted and which is traveling on a curve, comprising:

angular velocity detection means for detecting a lateral acceleration of said vehicle when said vehicle is traveling on a curve;

a distance sensor for producing pulses at travel intervals of said vehicle of a predetermined distance;

vehicle velocity detection means for detecting a velocity of said vehicle on the basis of said pulses generated by said distance sensor;

turning radius calculation means for calculating a turning radius of said vehicle by dividing the square of said vehicle velocity detected by said vehicle velocity detecting means by said lateral acceleration detected by said acceleration detection means;

target position calculation means for calculating a target position of said illuminating angle of said lighting means on the basis of said turning radius calculated by said turning radius calculation means; and illuminating angle control means for controlling said illuminating angle of said lighting means to be coincident with said target position calculated by said target position calculation means.

10. A vehicular cornering lamp system for varying the illuminating angle of a lighting means of a vehicle on which said lamp system is mounted and which is traveling on a curve, comprising:

angular velocity detection means for detecting an angular velocity of said vehicle when said vehicle is traveling on a curve;

vehicle velocity detection means for detecting a velocity of said vehicle;

calculating means for calculating a turning radius by dividing said vehicle velocity by said angular velocity and calculating a target position of said illuminating angle of said lighting means on the basis of said turning radius; and illuminating angle control means for controlling said illuminating angle of said lighting means to be coincident with said target position calculated by said calculating means.

11. The vehicular cornering lamp system of claim 10 wherein said calculating means comprises an A/D converter for converting said angular velocity into a digital signal, a counter for outputting said vehicle velocity as counted velocity data, a divider for dividing the digital signal by said counted velocity data, a D/A converter for converting the output from said divider into an analog signal, and an operation amplifier for outputting said target position by inverting and amplifying said analog signal.

12. The vehicular cornering lamp system of claim 11, further comprising a first latch coupled between said A/D converter and said divider, and a second latch coupled between said counter and said divider, for latching, respectively, the digital signal and the counted velocity data prior to being input into said divider.

13. The vehicular cornering lamp system of claim 10, wherein said illuminating angle control means comprises a motor for controlling said illuminating angle and a differential amplifier for calculating a difference between an actual position of said illuminating angle and the target position calculated by said calculating means and for controlling said motor in accordance with said difference.

14. The vehicular cornering lamp system of claim 13, wherein said illuminating angle control means further comprises an illuminating angle sensor for detecting the actual position of said illuminating angle of said lighting means.

15. The vehicular cornering lamp system of claim 14, wherein said illuminating angle control means controls said illuminating angle of said lighting means so that the actual position detected by said illuminating angle sensor becomes coincident with said target position calculated by said calculating means.

16. The vehicular cornering lamp system of claim 10, wherein an arithmetic unit housing at least said calculating means and said illuminating angle control means is unitarily formed with said angular velocity detection means.

* * * * *